T. ZIMMERMAN.
AXLE.
APPLICATION FILED OCT. 17, 1918. RENEWED SEPT. 11, 1919.

1,388,397.

Patented Aug. 23, 1921.
3 SHEETS—SHEET 2.

Inventor
THOMAS ZIMMERMAN.

By

Attorney

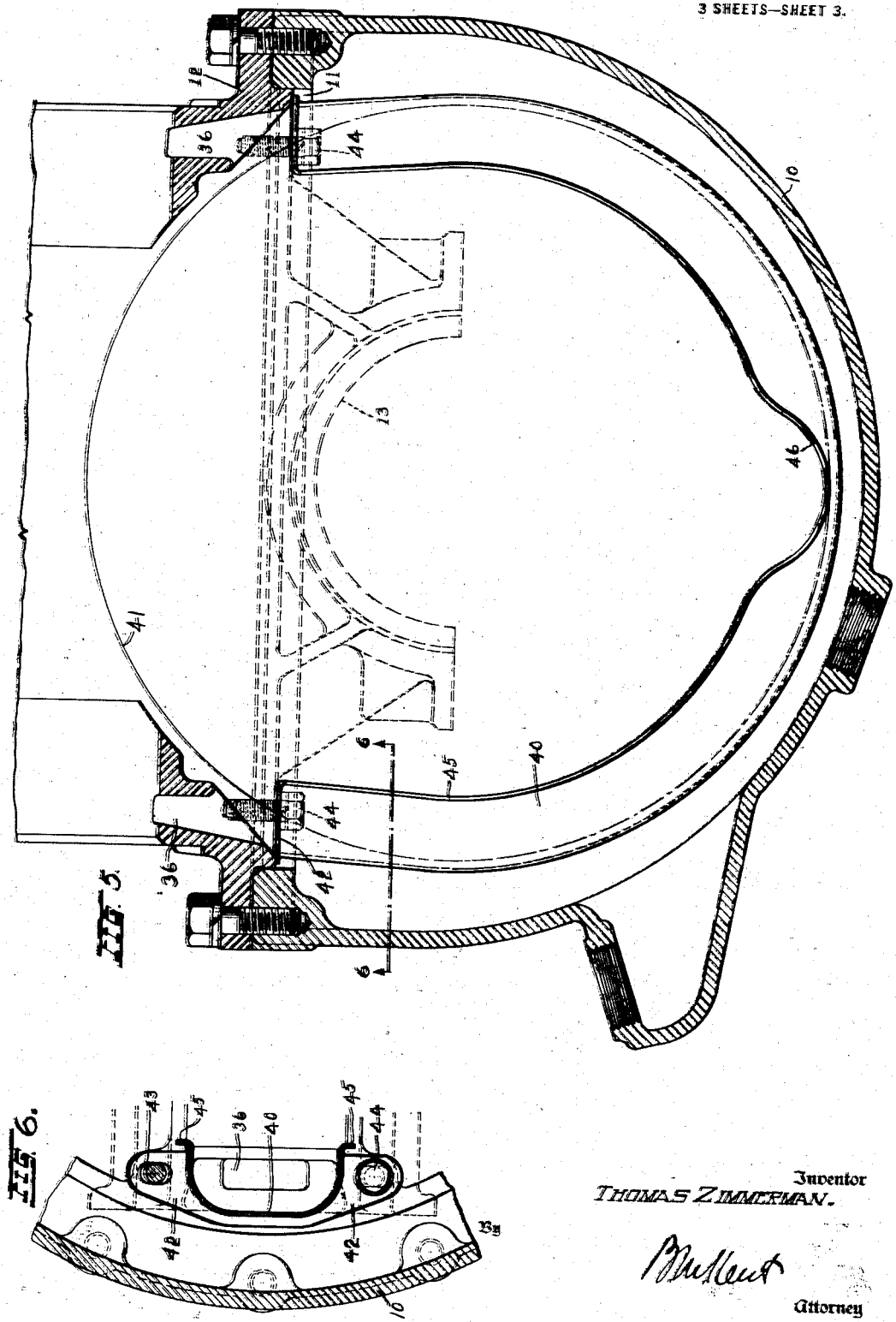

UNITED STATES PATENT OFFICE.

THOMAS ZIMMERMAN, OF CLEVELAND, OHIO, ASSIGNOR TO THE STANDARD PARTS COMPANY, OF CLEVELAND, OHIO, A CORPORATION OF OHIO.

AXLE.

1,388,397.  Specification of Letters Patent.  Patented Aug. 23, 1921.

Application filed October 17, 1918, Serial No. 258,593. Renewed September 11, 1919. Serial No. 323,129.

*To all whom it may concern:*

Be it known that I, THOMAS ZIMMERMAN, a citizen of the United States, and a resident of Cleveland, county of Cuyahoga, State of Ohio, have invented certain new and useful Improvements in Axles, of which the following is a specification.

This invention relates to axles and more particularly to means for effectually lubricating the parts that are subjected to wear.

It is one of the objects of the invention to provide in a driving axle, means whereby one of the gears may be utilized as an element of a pump for lifting copious quantities of the lubricant from the lower part of the axle housing to the bearings and the driving means.

Other objects and the features of novelty will be apparent from the following description taken in connection with the accompanying drawings, wherein I have described and illustrated my invention as applied to an axle of the worm gear drive type. In the drawings:

Fig. 3 is a detail section of the housing on the line 3—3 of Fig. 1;

Fig. 4 is a view similar to Fig. 3 but showing a slight modification;

Fig. 5 is a transverse section similar to Fig. 1, with parts omitted, and showing a modified form of the invention; and Fig. 6 is a section on line 6—6 of Fig. 5.

Figure 1:
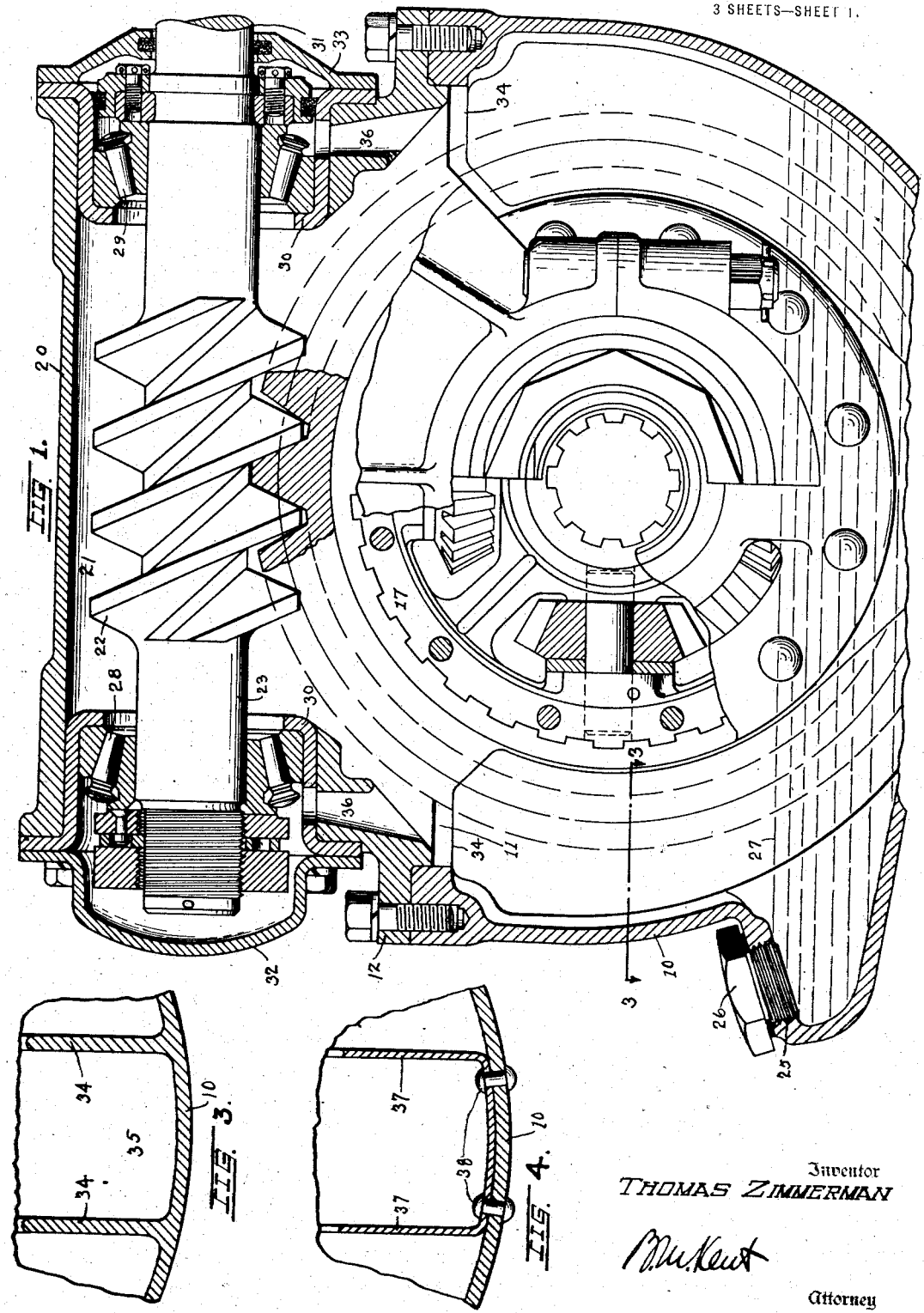
Figure 1 is a transverse section through an axle embodying the invention, the section being in the plane of the worm axis.
Figure 2:
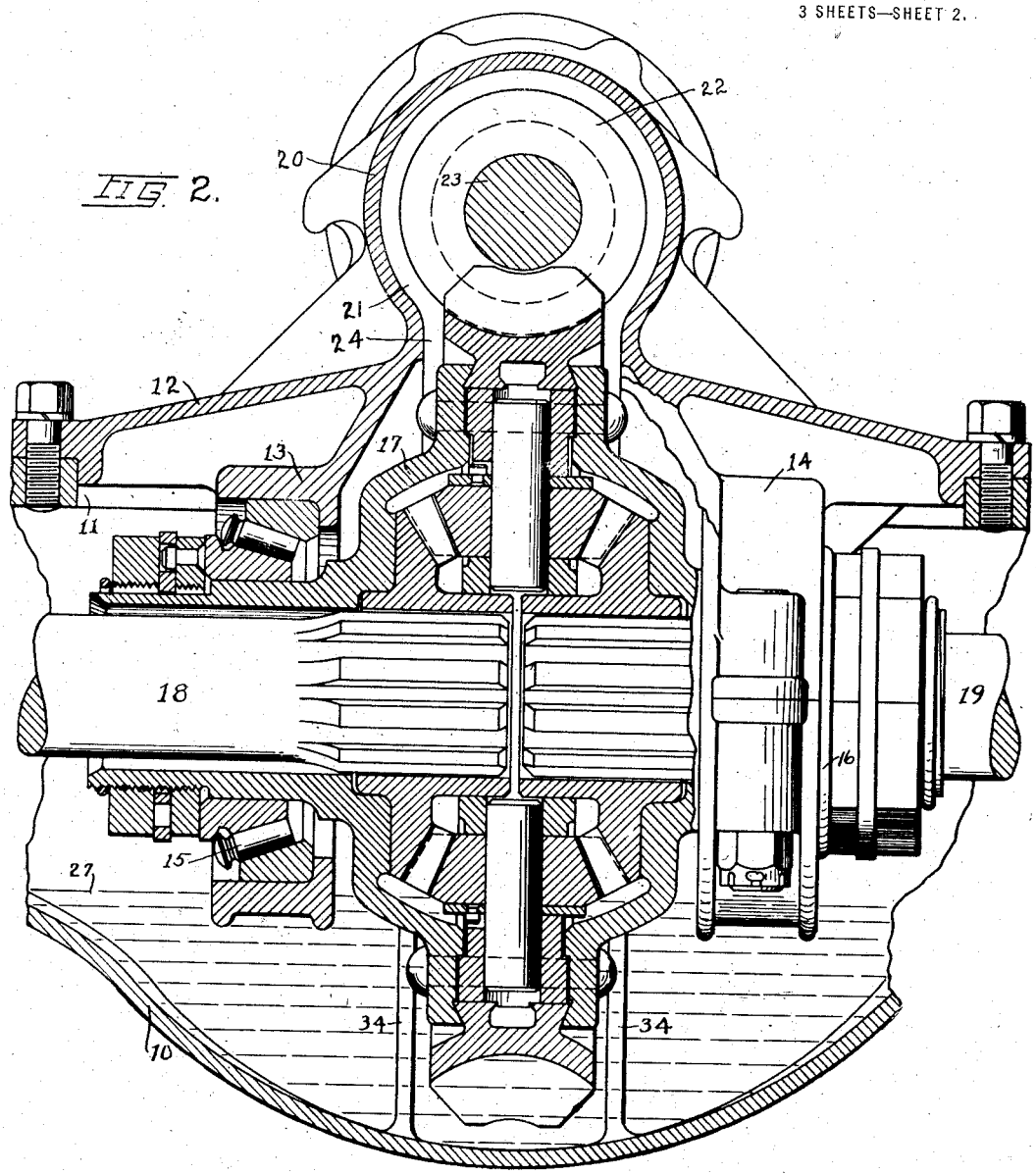
Fig. 2 is a longitudinal section through the same on the axis of the differential gearing.

Referring to the drawings 10 indicates the axle housing, which, in the form illustrated, has an opening 11 in its top side, this opening being closed by a cover plate 12, which carries brackets 13 and 14 on the interior of the housing, these brackets supporting bearings 15 and 16, respectively, for the differential gearing 17. The shafts 18 and 19, extending to the wheels, are driven by the differential gearing 17 in the usual manner and the details of the differential mechanism may be of any preferred design and a description of such details is omitted because they form no part of the present invention. The cover plate 12 has the upward extension 20 which forms a chamber 21 for the worm 22, which may be integral with, or secured on, a suitable shaft 23, as preferred.

The wall 20, forming the chamber 21 conforms closely to the exterior of the worm 22 and the differential gearing 17 projects upwardly through an opening 24 into mesh with the worm 22. The housing 10 is provided with an opening 25 which is usually closed by a plug 26, this opening being for the purpose of supplying lubricant to the interior of the housing, and when the axle is in use the level of the lubricant should be maintained at approximately the line 27. The shaft 23 is supported in suitable bearings 28 and 29 arranged on opposite sides of the worm 22 and suitably supported in cups 30 arranged in the ends of the chamber 21. The shaft 23 has an extension 31 for connection with the propeller shaft of the vehicle and the cups 30 have their outer ends closed by suitable caps 32 and 33.

In order to convey the lubricant from the lower part of the housing 10 to the bearings 28 and 29 and to the worm 22, I have arranged on the interior of the housing 10 and close to the sides of the differential gear, walls 34 which, as shown in Fig. 3, form a channel 35 in which the teeth of the differential gear run. I prefer to provide walls 34 on the front and rear walls of the housing 10, as clearly shown in Fig. 1, so that the lubrication of the parts will be uniform without regard to the direction of rotation of the differential gear 17. The walls 34 preferably extend to a point close to the top of the housing 10 and in order that bearings 28 and 29 may be supplied with lubricant, ports 36 are formed in the walls of the cover 12. I prefer to omit the walls 34 at the middle of the bottom of the housing in order that the lubricant may flow freely into the channels 35.

The operation of the invention is as follows: When the differential gearing 17 is rotated, the teeth on one side move upwardly in one of the channels 35, depending upon the direction of rotation, and act as buckets which raise the lubricant and distribute it through one of the ports 36 to the adjacent bearing, and also into the chamber 21 where it will be delivered to the worm 22 and lubricate the latter. It will be understood that the lubricant which is usually employed in axles is of a very heavy and thick consistency and this aids in the operation of the device, as the slow-flowing character of the lubricant will result in maintaining the channel 35 full of lubricant and insuring delivery thereof through the port 36 and into the chamber 21 in ample quantities.

It will also be noted that the lubricant which flows through one of the ports 36 will be distributed to all parts of the adjacent bearing 28 or 29 on account of the rotation of the latter, and that the lubricant will flow out of this bearing into the chamber 21 and along the worm 22 and through the bearing at the opposite end, in the reverse direction, and be discharged downwardly through the other port 36. I find in practice, that the operation just described thoroughly lubricates all of the working parts and insures against the difficulty that has heretofore arisen in connection with the lubrication of worm gear axles on account of the worm being located above the differential gear.

In Fig. 4 I have illustrated a modification of the arrangement shown in Fig. 3, the walls 37 being formed of sheet metal secured on the interior of the housing 10 by rivets 38.

In the modification shown in Figs. 5 and 6 there is secured to the inner face of the cover plate 12 a U-shaped member 40 which is of channel shape in cross-section and incloses the periphery of the differential gear, the outer line of the teeth of which is indicated by the line 41. As shown in Fig. 6, the member 40 has ears 42 on opposite sides at each end, these ears being formed with elongated holes 43 which receive the bolts 44, by which the member 40 is secured to the cover plate. The member 40 being of channel-section is comparatively rigid and further strength is given to the structure by forming thereon the flanges 45.

The advantage of this construction lies in the fact that the member 40 may be secured in position on the cover plate when the latter is detached from the housing 10, and the different gear will act more efficiently as a lubricant pump on account of the member 40 conforming more closely to the outer ends of the teeth than do the walls of the channels 35 of the other modifications. This construction also avoids the use of walls 34 or 37 on the interior of the housing. If preferred, the side walls of the member 40 may be reduced in depth, as indicated at 46, in the region of the bottom of the housing, for the purpose of freely admitting lubricant into the channels of the member 40.

While I have illustrated and described one application of my invention, it is understood that changes may be made in the details of construction, to correspond with the requirements of other applications thereof, without departing from the spirit of the invention which is described in the appended claims.

Having thus described my invention what I claim is:

1. In mechanism of the class described, the combination of a housing, a gear therein, a shaft above said gear, a worm on said shaft, bearings for said shaft on opposite sides of said worm, said housing closely surrounding the sides and top of said worm, and walls on the interior of said housing adjacent the sides of said gear forming a channel through which lubricant will be lifted by said gear from the lower part of the housing to one of said bearings and carried from the latter by said worm to the other of said bearings.

2. In mechanism of the class described, the combination of a housing, a gear therein, a shaft above said gear, a worm on said shaft, bearings for said shaft on opposite sides of said worm, means for supporting said bearings in said housing, and walls on the interior of said housing adjacent the sides of said gear and whereby a channel is formed through which lubricant is lifted to said bearings and said worm, there being ports in said supporting means through which the lubricant flows to or from said bearings.

3. In mechanism of the class described, the combination of a housing having an opening in one side, a cover for said opening having internal bearing brackets, a gear supported in said brackets, a shaft carried in said cover and having a member meshing with said gear, bearings for said shaft on opposite sides of said member, and means on the interior of said housing forming one or more channels in which the periphery of said gear runs and through which the teeth of the gear raise lubricant to said bearings and said member.

4. In mechanism of the class described, the combination of a housing having an opening in one side, a cover for said opening having internal bearing brackets, a gear supported in said brackets, a shaft carried by said cover and having a member meshing with said gear, bearings for said shaft on opposite sides of said member, and means carried by said cover plate projecting into the bottom part of said housing and providing one or more channels in which the periphery of said gear runs, and through which the teeth of the gear raise lubricant to said bearings and said member.

5. In mechanism of the class described, the combination of a housing having an opening in one side, a cover for said opening having internal bearing brackets, a gear supported in said brackets, a shaft carried by said cover and having a member meshing with said gear, bearings for said shaft on opposite sides of said member, and channel-shaped means adjustably secured on the inner face of said cover and closely conforming to the periphery of said gear and through which the teeth of the gear raise lubricant to said bearings and said member.

6. In mechanism of the class described, the combination of a housing having an opening in one side, a cover for said opening having internal bearing brackets, a gear supported in said brackets, a shaft carried by said cover and having a member meshing with said gear, bearings for said shaft on opposite sides of said member, and a substantially U-shaped member of channel cross-section secured to the inner face of said cover and closely conforming to the periphery of said gear and through which the teeth of the gear raise lubricant to said bearings and said member.

7. In mechanism of the class described, the combination of a housing, a gear therein, means in said housing for driving said gear comprising a shaft, a bearing for said shaft, and a channel on the interior of said housing in which said gear runs and through which lubricant will be lifted by said gear to said bearing.

8. In mechanism of the class described, the combination of a housing having an opening at one side, a cover for said opening having internal bearing brackets, a gear supported in said brackets, means for driving said gear, and a channeled member carried by said cover and closely conforming to the periphery of said gear through which lubricant will be raised by said gear to said driving means.

9. In mechanism of the class described, the combination of a housing having an opening in one side, a cover for said opening, a gear and driving means therefor carried by said cover, and a member of channel shape in cross-section carried by said cover and closely conforming to the periphery of said gear whereby lubricant will be raised by said gear to said driving means.

In testimony whereof I affix my signature.

THOMAS ZIMMERMAN.